Oct. 19, 1926.

Re. 16,441

R. F. STURGIS

OIL BURNER

Original Filed Feb. 7, 1925

Inventor

Raymond F. Sturgis

By Knight Bros

Attorneys

Reissued Oct. 19, 1926.

Re. 16,441

UNITED STATES PATENT OFFICE.

RAYMOND F. STURGIS, OF RAHWAY, NEW JERSEY, ASSIGNOR TO TORRIDION COMPANY, OF NEW YORK, N. Y., A CORPORATION OF DELAWARE.

OIL BURNER.

Original No. 1,583,024, dated May 4, 1926, Serial No. 7,574, filed February 7, 1925. Application for reissue filed July 28, 1926. Serial No. 125,574.

This invention relates to burners for fuel oils or the like, and has for its object to produce in a compact, durable and cheap form a burner which will give intense combustion for use in furnaces used for melting purposes, or similar apparatus. The invention may be applied also to household furnaces for heating.

One feature of the invention consists of a series of superposed oil pans of any desirable shape or form, each one forming a reverberatory surface by its bottom for the deflecting upon the oil of the pan below of an air draft caused to pass over the oil from one side of the pan to the other, side walls confining the air passage on the sides. Another feature of the invention involves means for maintaining oil at fixed levels in the pans by oil level regulating devices individual to each pan. Another feature involves the application of a forced air blast through ducts made in the pans, a plurality of holes from the ducts directing transverse jets of air across the draft of mixed air and vapor as it issues from the pans. Other details of the invention will appear from the following description in reference to an embodiment of the invention as shown in the accompanying drawings, in which—

Figure 1:
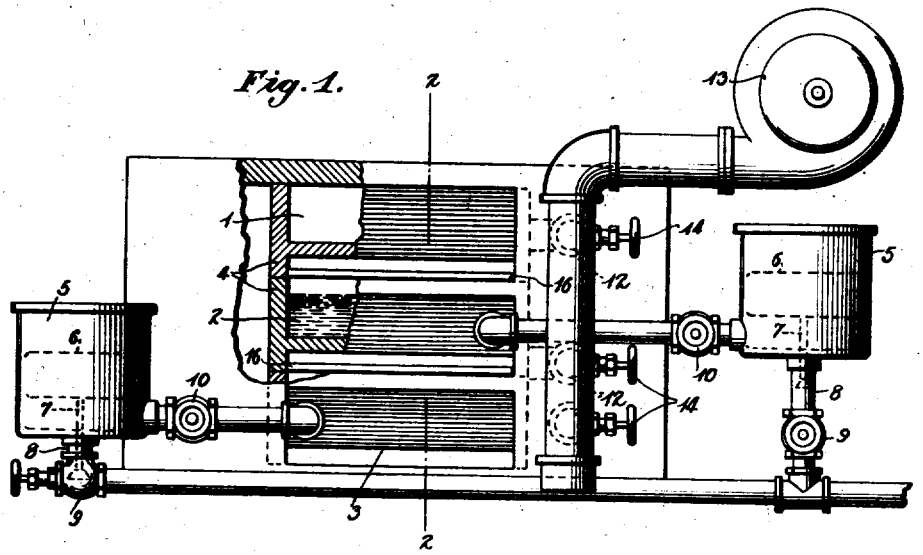
Figure 1 is an end view in partial section of a burner and its appurtenances, constructed according to my invention.
Figure 2:
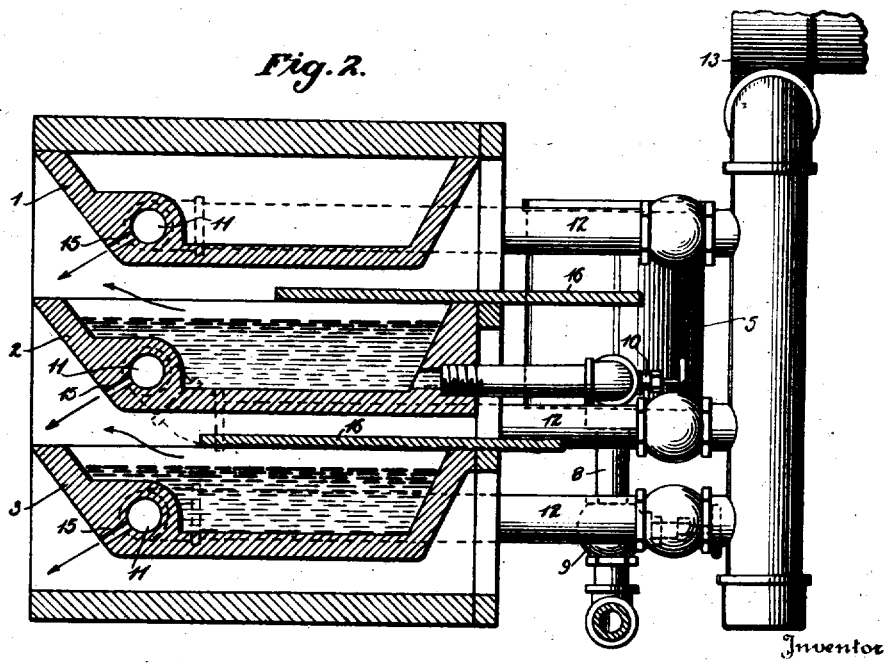
Figure 2 is a transverse section of the same taken on the plane of the line 2—2 of Figure 1.

In the drawings, I have shown three superposed oil pans 1, 2 and 3. These pans are preferably made with side walls shown at 4. The pans are made shallower than the side walls and the end walls are inclined or flared. The construction is such that the pans can be mounted in superposed relation to provide an air passage between the pans from end to end, the passage having, due to the inclined ends, first, a downward course, then a horizontal course over the surface of oil in the pans, and, finally, an upward course as it passes out of the pans. The bottom of one pan in this way forms a deflector for the air draft forcing the air down over the surface of the oil. The oil is maintained at a constant level in each pan by having a suitable float control such as shown at 5, one for each pan. These float controls are of the usual construction, having a float 6, shown in dotted lines, with a valve 7 controlling an opening into an oil supply pipe 8, the flow of oil to and from the oil control being established through stop cocks 9 and 10. The floats of the control mechanism are adjusted at such a height that the oil in each pan will come up nearly to the surface of the pan. The top pan will be used only as a reflector and need not be supplied with oil. In the forward or discharge end of each pan there is formed a passage 11 to which air under forced draft is supplied by pipes 12 from a blower 13, valves 14 being used to control the flow. From the passages 11 small openings 15 permit the air blast to pass out of the passages in a plurality of jets directed across the outflowing mixture of air and oil vapor in line with the burner lip or discharge edge of the pan below, as shown by the arrows, and at this point the mixture is caused to burn with its maximum intensity. By this means, accumulation of carbon on the discharge lip is prevented.

Damper plates 16 adapted to be pushed over the top of the pans from the rear furnish a means for regulating the surface of oil exposed to the draft, whereby the output and character of combustion of the burner may be further varied.

In operation, the apparatus being supplied with oil, a piece of waste or other means, is used to set fire to the oil, combustion will proceed until the pans become heated to the proper degree, when by proper adjustment of the air control valve 14, an intense degree of heat will be produced and with the air supplied first by natural draft as it passes over the oil and next by a subdivided forced draft as it commences to burn, will result in complete combustion, no more air being used than is exactly required to produce this result. Instead of air being supplied to the passages 11, steam may be used for this purpose, or a combination of air and steam.

From the above description it will be evident that I have produced an oil burner for furnaces, which possesses the peculiarity of multiple units, which may be aggregated in combinations of 2, 3, 4 or the like, up to any number required by the demands of the furnace. Parts of each unit can, therefore, be standardized without restricting the size of the eventual combination. It will also be seen that each unit performs the four-fold function of an oil container, an oil heater, an air deflector or reverberator, and a forced draft nozzle. It will be seen that not only can the oil be preheated to a degree sufficient to vaporize the same at the desired speed without carbonizing the same, but that the air blast also is preheated. It will also be seen that the compressed air blast is directed to the burner lip or discharge edge of the burner where carbon is most likely to accumulate and with the result that such carbon deposit is minimized.

I claim:—

1. In an oil burner, the combination of a plurality of pans superposed so as to form air passages between them, each pan having a burner lip on its discharge end, a reservoir for oil, means for feeding oil to each pan from the reservoir, a duct in each pan adjacent to the discharge end, and passages from each of said ducts in line with the burner lip of the pan below, whereby compressed air in said ducts will cool the discharge ends of the pans and be directed in jets across the burner lips of the pans to prevent the accumulation of carbon thereon.

2. In an oil burner, the combination of a plurality of pans with inclined walls on the discharge end, superposed so as to form air passages between them, a reservoir for oil, means for feeding oil to each pan from the reservoir, a duct in each pan adjacent to the discharge end, and passages from said ducts in line with the burner lip of the pan below, whereby compressed air in said ducts will cool the discharge ends of the pans and be directed in jets across the burner lips to prevent the accumulation of carbon thereon.

3. In an oil burner, the combination of a plurality of pans superposed so as to form air passages between them, each pan having a burner lip on its discharge end, a reservoir for oil, means for feeding oil to each pan from the reservoir, a duct in each pan adjacent to the discharge end, passages from each of said ducts in line with the burner lip of the pan below, and dampers slidable over the tops of the pans toward and away from the burner lips for varying the surface of oil exposed to the draft.

RAYMOND F. STURGIS.